June 5, 1945.  L. M. WILEY  2,377,393
METHOD OF FORMING PLASTIC COATED CONTAINERS
Filed Oct. 15, 1942
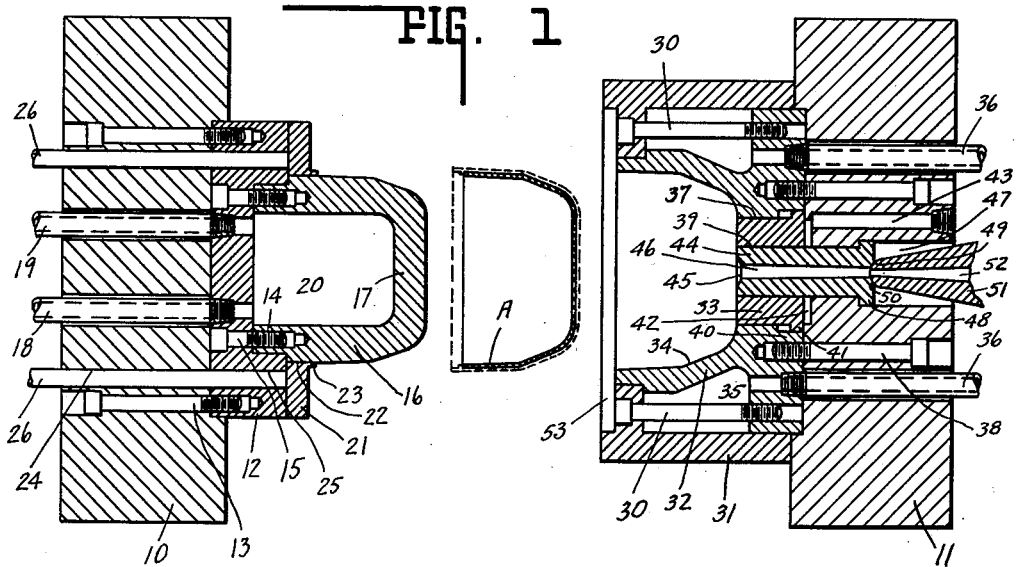
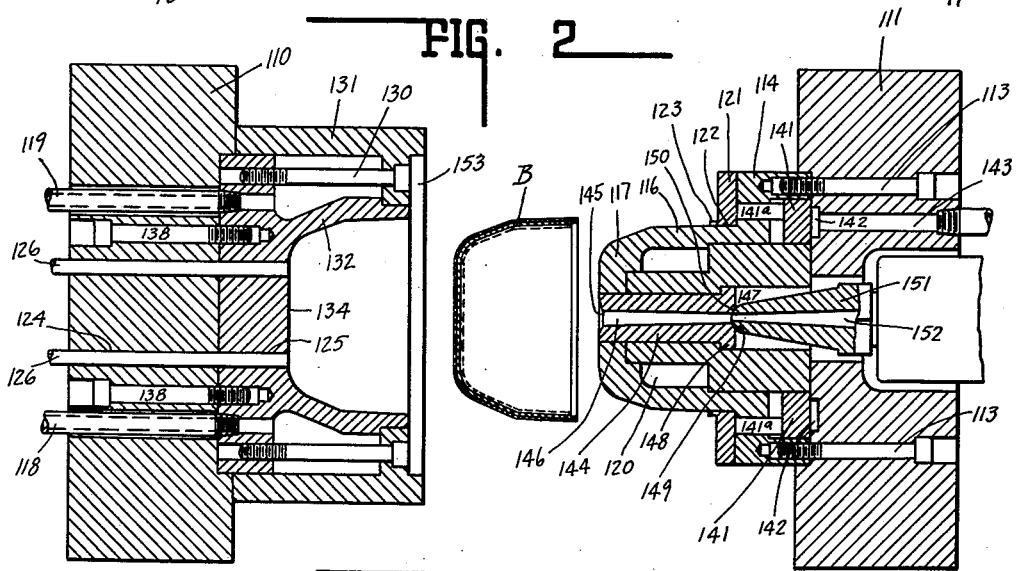
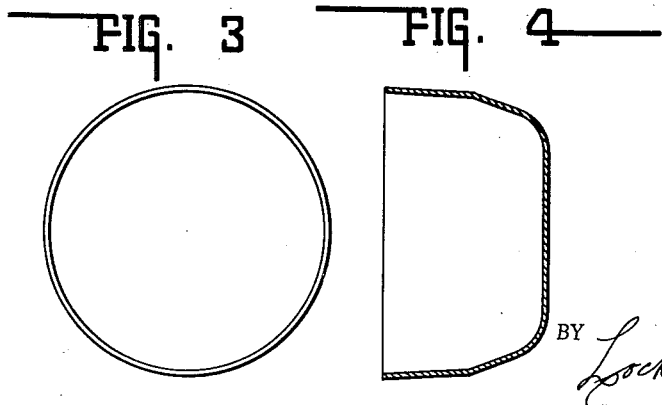
INVENTOR.
LEE M. WILEY.
BY Lockwood, Goldsmith & Galt,
ATTORNEYS.

Patented June 5, 1945

2,377,393

UNITED STATES PATENT OFFICE 2,377,393

METHOD OF FORMING PLASTIC COATED CONTAINERS

Lee M. Wiley, Marion, Ind., assignor of one-third to Reeley B. Wiley and one-third to Julian T. Lett, both of Marion, Ind.

Application October 15, 1942, Serial No. 462,124

1 Claim. (Cl. 18—59)

The invention relates to the process of preparing a fibre core plastic coated container or like article.

The container formed in the manner illustrated, described and claimed in the following co-pending applications is the core of the present structure. These applications are made a part hereof and are: Serial No. 288,343, filed August 4, 1939; Serial No. 316,742, filed February 1, 1940; Serial No. 334,823, filed May 13, 1940; Serial No. 355,968, filed September 9, 1940; Serial No. 444,671, filed May 27, 1942; and Serial No. 444,672, filed May 27, 1942.

The core resulting from the aforesaid processing is essentially a flat sheet of pulp arranged in the desired shape by creasing and compressing the container side wall forming portion thereof into a unitary wall devoid of creases, wrinkles, etc., and finally formed to said desired shape.

This core, accordingly, is seamless, quite rigid, unbreakable, that is not-shatterable, yet has some resiliency therein.

The chief object of the present invention is to provide a method of forming a plastic container having all the advantages of molded solid plastic containers, with none of the disadvantages thereof.

This objective is attained by coating a core of the aforesaid character with plastic material.

The chief feature of the present invention is the discovery that such a core of the character specified, while comparatively rigid, has slight resiliency and will retain its shape while subjected to pressures necessary for plastic molding and temperatures. Since the core itself is initially formed by pressure application and heat, the plastic coating, when so applied thereto, becomes homogeneously united to core and substantially inseparable therefrom, the resulting product having all the surface advantages of a solid plastic article and none of its disadvantages and all of the advantages of the core as well, the latter eliminating the solid plastic disadvantages.

Other objects and features of the invention will be set forth more fully hereinafter.

For the purposes of this invention, the process of preparation will, by way of example only, be given as applied to the injection pressure molding type, although it is not necessarily restricted thereto.

For convenience also, the process will be described as of two step type and of such character that a transfer from one mold to another must be effected. This, however, does not preclude the utilization of the single step type for forming a completely covered core, for in that case, the plastic may be applied simultaneously or successively in the same mold to the interior and exterior of the core.

For the purposes of this invention the article used, by way of example, is of the completely covered type, although if desired such an article covered interiorly or exteriorly only may be fabricated when same only is desired.

Since a core is used, and same, as stated, is to be completely coated, the thermoplastic process (molding by heat and pressure and setting by cooling) is preferred over the thermo-setting molding process (molding in a closed mold under heat and pressure granular thermo-setting material).

The preference is obvious because in the former the plastic is liquid when supplied to the mold and core. A better and more uniform product, accordingly, can be obtained therewith. The preference is obvious also when it is understood that four to six cycles per minute can be made with the injection process and only one cycle per four to six minutes can be made with the other process.

By way of example only, the core may be about 0.02 upwards of an inch thick and have applied thereto interiorly and exteriorly plastic coating of approximately 0.015" of an inch, so that a completely coated article—or resilient, but comparatively stiff, paper pulp cored, plastic container can be produced, having a thickness of about one-tenth of an inch, more or less.

Briefly, the preferred process is to support the core upon a male mold, and inject the liquid plastic into the cooperating heated female mold when the two are closed together with the core therein. In this instance, the core supporting male mold is substantially at room temperature, while the female mold is heated to between four and five hundred (450° F.) degrees.

Following injection and setting by cooling, the molds are opened and the exteriorly coated article is removed from the male mold, the gate trimmed off and the trimmed article seated in a female mold. The cooperating, similarly heated male mold is then associated with that cool female mold in closed relation, liquid plastic is applied thereto and following setting by cooling, the molds are separated, the completely coated article trimmed as before and removed, or removed and trimmed, certain advantages accruing when trimming in place is effected, especially when trimming the exterior coating.

The application of coating as shown in single cycles herein can be operated progressively wherein the outside of one form is being covered and the inside of the other is also being covered, thereby producing a container completely coated both inside and outside during each cycle of the moulding press.

Having thus briefly described the core utilized and the resulting product, and having more completely described the available processes for producing same and the preferred process, reference now will be had to the apparatus suitable for practicing the latter.

The full nature of the invention will be understood from the accompanying drawing and the following description and claim.

In the drawing,

Fig. 1 is a central sectional view of an injection type molding apparatus with the mold open and the resulting product illustrated in section and therebetween and illustrative of one step or cycle of the preferred method.

Fig. 2 is a similar view of another step or cycle thereof and usually the latter is the second step, since the interior coat is herein applied and it is the inequality equalizing coat. When the interior is more critical than the exterior, the former will be first fabricated and then the exterior coat fabricated. In other words, Figs. 1 and 2 structures, representing one sequence, may be utilized in reverse order.

Fig. 3 is a top plan view of the core shown in Figs. 1 and 2.

Fig. 4 is a central sectional view of said core.

In Fig. 1 of the drawing, 10 indicates a conventional representation of a support and 11 a similar confronting support. Said supports are capable of being brought towards each other and moved away from each other. Either or both may be moved. Usually the plastic supply end is stationary, but not necessarily so.

A base 12 is carried by platen 10 and detachably connected thereto as at 13. To this base is secured as at 15 the base portion 14 of the male mold 16 having the closed end 17. The exterior of said mold 16—17 conforms to the core interior, same being designated by the letter A.

The mold is hollow and tubes 18—19 extending through the platen 10 communicate with the mold interior 20 and when supplied with circulating cooling liquid serve to maintain said mold at substantially room temperature.

Slidably supported upon the mold portion 16 is the stripping plate 21 apertured at 22. It also includes a flange 23 for container edge channel formation. Platen 10 and base 12 have registering bores 24—25 respectively in which is reciprocably mounted ejection pins 26. These when moved toward the mold 16—17 strip the container therefrom.

Herein the stripper functions as a portion of the mold. Also all of the aforesaid parts move as a unit toward and away from platen 11 in timed relattion to the ejection operation.

In the right hand portion of Fig. 1, the stationary platen 11 supports a triple part female mold structure, the outer part being indicated by 31, the major and intermediate portion by 32 and the central portion by 33. Portions 31 and 32 are secured together as at 30 and form therebetween and about the mold cavity 34 a heating chamber 35. Tube 36 extending through platen 11 provides for heating this cavity by a circulating heated medium such as hot oil, water, steam, electricity or the like.

The intermediate mold member 32 is centrally apertured at 37 and secured to the platen 11 at 38. Slidably in the aperture, if necessary, is the central portion 33, which is also centrally apertured at 39. This portion 33 is in effect a part ejector, for member 32 has its aperture 37 enlarged at 40 and member 33 is flanged as at 41, the flange seating in the enlargement and having a piston action.

The adjacent face of platen 11 is recessed at 42 and a supply duct 43 communicates therewith. When compressed air is supplied to duct 43, the resulting pressure in the recess 42, effective upon the flanged end of member 33, forces same to the left to eject the part. This ejection is timed.

Positioned in the aperture or bore 39 of central part 33 is an elongated tubular structure 44 slightly recessed at 45 in the mold cavity 34 exposed end. Communicating therewith is plastic supply passage 46 of outwardly tapering form. The inner end of the member 44 is seatable in chamber 47 in platen 11 and flange 48 on the member limits forward movement thereof. The face of this flange 48 in chamber 47 concentric with passage 46 is of partially spherical socket type as at 49. The complementary nose 50 of the ejection nozzle 51 seats therein and supply passage 52 communicates with passage 46 to supply plastic in liquid form to the mold cavity 34.

When the platens are properly juxtapositioned the core A seats on male mold 16 and 17 and the plate 21 nests in cavity 53 formed in the open face of member 31. The male mold and core thereon then is nested in cavity 34. Pressure of the discharging liquid plastic ("Tenite") then fills the space between the core and cavity and hence the outside coating conforms exactly to the desired exterior and is complementary to the mold cavity exterior.

After the plastic has set by cooling, the male mold and its platen may be retracted. In so doing compressed air supplied to passage 43 operates member 33 to eject the article from the female mold. The sprue or gate adhering may be trimmed, while the article is on the male mold, but spaced from the female mold. When the molds are sufficiently separated ejection pins 26 act actuated to strip the exteriorly covered core from the male mold.

Reference will now be had to Fig. 2 and in general the structure illustrated therein is similar, wherefore numerals of the one hundred series indicate like or similar parts indicated by the primary series of numbers. Herein the completely covered article is designated by the letter B. In this form female mold cavity 134 includes chamber 135 provided with circulating cooling liquid as by 118—119 to hold this mold at the desired low temperature, usually room temperature.

In like manner a male die structure is now carried by stationary platen 111 and equipped with an injection nozzle and heating means in the same manner as the female mold in Fig. 1 was so equipped.

The chief difference herein is that ring 141, acting as a piston under pressure in chamber 142, actuates pins 141a to slide the mold forming and stripping ring 121 on male mold 116 to eject or separate the article from the male mold when the platens are sufficiently separated. This breaks the sprue as before.

The completely coated core, now nested in the female mold, at the proper time and when the latter is sufficiently spaced from the male mold is ejected from the cavity 134 by the pins 126. While in the cavity, or after ejection therefrom, the sprue stub edge may be suitably removed from the completely coated article.

It is to be observed that again, as before, the plastic fills the mold chamber between the mold and the core. The result is a product that conforms inside and out to the prescribed form and dimensions.

Figs. 3 and 4 illustrate the core C used in the method, said core being of the general character illustrated and described in the aforesaid applications.

While the invention has been illustrated and described in great detail in the drawing and foregoing description, the same is to be considered as illustrative and not restricting in character.

The several modifications described herein as well as others which will readily suggest themselves to persons skilled in this art, all are considered to be within the broad scope of the invention, reference being had to the appended claim.

The invention claimed is:

A method of forming a plastic coated fibrous core reenforced relatively deep seamless container, the core being initially formed to approximate container form from a flat sheet of pulp comprising subjecting one of the interior and exterior surfaces of the container shaped core to exposure for plastic coating while supporting the other surface for resistance against pressure to be applied to first surface, then injection molding the plastic material to the first surface and pressure consolidating that material into a continuous coating and simultaneously bonding same homogeneously to the first surface while same is supported for pressure resistance, the coating being applied to the desired final dimensions of the corresponding surface of the container, then supporting the partially coated container for exposure of the said other surface for resistance to pressure to be applied thereto, and then injection molding the plastic material to that surface by pressure consolidating the material into a continuous coating of the desired final dimensions of the corresponding surface of the container, simultaneously bonding the coating homogeneously to the said other surface and uniting the coatings at the container edge to form a fibrous core reenforced, completely coated, plastic covered, accurately dimensioned container.

LEE M. WILEY.